(12) United States Patent
Schöning et al.

(10) Patent No.: US 11,313,326 B2
(45) Date of Patent: Apr. 26, 2022

(54) JET ENGINE HAVING FAN BLADES WITH AIR AND EXHAUST GAS FLOW CHANNELS

(71) Applicants: Finn Schöning, Hamburg (DE); Dragan Kožulović, Hamburg (DE)

(72) Inventors: Finn Schöning, Hamburg (DE); Dragan Kožulović, Hamburg (DE)

(73) Assignee: Finn Schöning, Hamburg (DE)

( * ) Notice: Subject to any disclaimer, the term of this patent is extended or adjusted under 35 U.S.C. 154(b) by 0 days.

(21) Appl. No.: 16/640,234

(22) PCT Filed: Aug. 10, 2018

(86) PCT No.: PCT/DE2018/100705
§ 371 (c)(1),
(2) Date: Mar. 3, 2020

(87) PCT Pub. No.: WO2019/037816
PCT Pub. Date: Feb. 28, 2019

(65) Prior Publication Data
US 2020/0248649 A1 Aug. 6, 2020

(30) Foreign Application Priority Data

Aug. 21, 2017 (DE) ..................... 10 2017 119 070.8

(51) Int. Cl.
*F02K 3/068* (2006.01)
*F02C 3/09* (2006.01)
(Continued)

(52) U.S. Cl.
CPC ............... *F02K 3/068* (2013.01); *F02C 3/09* (2013.01); *F02C 3/145* (2013.01); *F02C 3/165* (2013.01)

(58) Field of Classification Search
CPC .... F02K 3/068; F02C 3/08; F02C 3/09; F02C 3/145; F02C 3/165
See application file for complete search history.

(56) References Cited

U.S. PATENT DOCUMENTS 3,269,120 A 8/1966 Sabatiuk
3,283,509 A 11/1966 Nitsch
(Continued)

FOREIGN PATENT DOCUMENTS

DE 1274449 B 8/1968
JP 2006-138206 A 6/2006
WO 2008/113088 A1 9/2008

*Primary Examiner* — Steven M Sutherland
(74) *Attorney, Agent, or Firm* — Howson & Howson LLP

(57) ABSTRACT

The invention relates to a jet engine with a fixed housing in which a primary flow is formed in which incoming air is burned in at least one combustion chamber, in said housing a secondary flow being formed in which incoming air is accelerated by a fan and, said secondary flow being expelled at the outlet cone of the housing together with the exhaust gas from the combustion chamber, said fan being mounted on a main shaft rotatably about an axis and having a plurality of substantially radially-extending fan blades. According to the invention, it is proposed that at least one fan blade or a plurality of the fan blades or all fan blades have at least one air inlet channel for the primary flow which directs the air of the primary flow through the fan blade to the combustion chamber, and that at least one fan blade or a plurality of the fan blades or all fan blades each have an outlet channel with an at least partially axially- and at least partially tangentially-oriented outlet opening in order to supply the exhaust gas of the combustion chambers to the accelerated air of the secondary flow, said air-exhaust gas mixture emerging at the outlet cone of the jet engine housing, producing the thrust.

6 Claims, 6 Drawing Sheets

Figure 1:
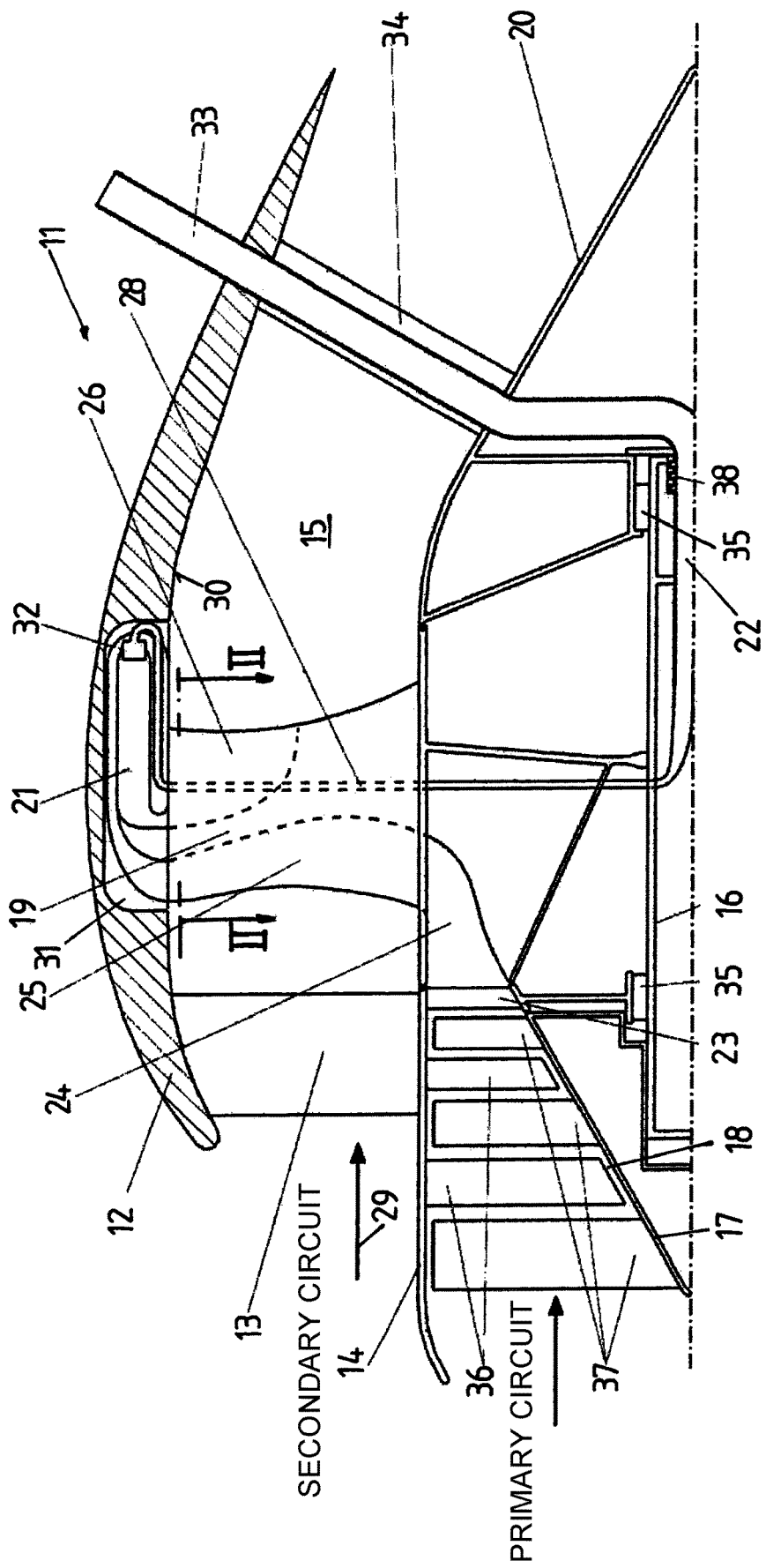

(51) Int. Cl.
  *F02C 3/14* (2006.01)
  *F02C 3/16* (2006.01)

(56) References Cited

U.S. PATENT DOCUMENTS 3,892,069 A    7/1975  Hansford
6,966,174 B2 * 11/2005 Paul .................. F02C 3/045
                                                60/226.1
8,033,092 B2  10/2011  Suciu et al.

* cited by examiner

JET ENGINE HAVING FAN BLADES WITH AIR AND EXHAUST GAS FLOW CHANNELS

The invention relates to a jet engine with a fixed housing in which a primary flow is formed in which incoming air is burned in at least one combustion chamber, in said housing a secondary flow being formed in which incoming air is accelerated by a fan and, said secondary flow being expelled at the outlet cone of the housing together with the exhaust gas from the combustion chamber, said fan being mounted on a main shaft rotatably about an axis and having a plurality of substantially radially-extending fan blades.

Such jet engines are generally known, and in different embodiments. A possible embodiment is a turbofan engine in which the secondary flow surrounds the primary flow on the outside. The arrangement is often such that the fan is initially disposed in the axial direction on the main shaft from front to back. Downstream of the fan, the inflowing air accelerated by the fan is divided into the inner primary flow and the outer secondary flow. The compressor, which is designed as an axial compressor, follows in the primary flow. The air compressed in this way enters the combustion chamber(s), which is (are) disposed axially downstream of the compressor. The fuel, usually kerosene, is burned with the compressed air in the combustion chamber. This air-exhaust gas mixture is expelled at the outlet cone of the housing, forming the thrust.

In order to drive the fan and the compressor, a turbine is arranged on the main shaft downstream of the combustion chambers, the turbine causing the required rotational movement of the fan and the compressor on the main shaft. Due to the axially-successive arrangement of the fan, the compressor, the combustion chambers, the turbine and the outlet cone, such a jet engine is relatively long in construction. Such a jet engine is also relatively heavy due to the large number of assemblies.

A jet engine is known from U.S. Pat. No. 8,033,092 B2, in which the turbine for driving the fan and the compressor annularly surrounds the fan. The fan has hollow blades which direct the combustion air to the annular combustion chamber. The exhaust gases from the combustion chamber drive the turbine and mix with the secondary flow downstream of the turbine. The exhaust gases are supplied to the secondary flow from the outside by way of an annular exhaust gas nozzle.

The object of the invention is to construct a jet engine differently so that it is shorter and lighter.

The object is achieved according to the invention in that at least one fan blade or a plurality of the fan blades or all fan blades have at least one air inlet channel for the primary flow, the inlet channel conducting the air of the primary flow through the fan blade to the combustion chamber, and in that at least one fan blade or a plurality the fan blades or all fan blades each have an outlet channel with an at least partially axially- and at least partially tangentially-oriented outlet opening in order to supply the exhaust gas of the combustion chambers to the accelerated air of the secondary flow, said air-exhaust gas mixture emerging at the outlet cone of the jet engine housing, thereby producing the thrust. Due to the arrangement of the air inlet channel of the primary flow in the fan blade, the inflowing air is further compressed due to the rotary movement.

Furthermore, the exhaust gas flow is directed to the back axially. On the other hand, the exhaust gas flow is also directed tangentially, so that the fan is driven in its direction of rotation by the recoil when the flow emerges from the outlet channel. This drives the main shaft, on which a compressor for the primary flow can also be disposed. There is no need for a turbine downstream of the combustion chambers to drive the compressor, so that the design space is further reduced. The entire turbine assembly is also done away with so that the jet engine is lighter overall. Furthermore, the outlet opening can extend over the entire free height of the fan blade in the annular flow channel so that good mixing of the primary flow and the secondary flow is achieved. In particular, mixing takes place over the entire annular cross section of the flow channel of the secondary flow.

Due to the arrangement of the air inlet channels and the outlet channels according to the invention, the jet engine can be designed on the one hand so that the combustion chamber is disposed in a part of the housing surrounding the fan. It is then expedient that the free ends of the fan blades open into a ring which has two circumferential openings and that one opening is in flow communication with the air inlet channel in the fan blade and with the air inlet opening of the combustion chamber, and that the other opening is in flow connection with the outlet channel in the fan blade and with the exhaust gas outlet of the combustion chamber. As a result, the primary flow is always conducted through closed channels.

It can be provided that the free ends of the fan blades each have a circumferentially-expanded first area which has the opening for the air inlet flow, and each also comprising a circumferentially-expanded second area which has the opening for the exhaust gas flow, said first and second areas having an arc-shaped contour as viewed from the front in such a way that in the assembled position the respective openings of the first and second openings form the respective circumferential openings. This simplifies the manufacture of the fan, which accordingly has a plurality of fan blades of identical design which are disposed along the circumference on the main shaft. The circumferential openings for the air inlet and the exhaust gas flow are then formed by the adjacent and abutting end regions during assembly.

It is also advantageous if the transition of the air inlet channel from the fan blade to the fixed combustion chamber and/or the transition from the fixed combustion chamber to the outlet channel in the fan blade take place by way of labyrinth seals. Such seals are robust and maintenance-free and form a sufficiently tight transition for the air inlet flow on the one hand and exhaust gas flow on the other hand.

On the other hand, the jet engine can also be designed such that the combustion chambers are disposed in the fan blades. Due to the arrangement of the combustion chambers in the fan blades, the combustion chambers do not require any additional axial design space, so that the jet engine is shorter. It is advantageous if the combustion chambers are disposed in the outer end regions of the fan blades. Then, before entering the combustion chambers the air is further compressed due to the radial flow direction and the rotary movement, so that a better efficiency can be achieved.

According to a preferred embodiment of the invention, it is provided that the outer end regions of the fan blades end in a circumferential fan ring in which the combustion chambers are disposed. The fan blades are stabilized by the ring, so that the centrifugal forces generated by the rotation can be absorbed well. The fan thus remains stable at the ends of the fan blades despite the weight produced by the combustion chambers.

Furthermore, it can be provided that the outer end regions of the fan and/or the circumferential fan ring run in a circumferential annular groove in the inside of the housing in such a way that only the middle sections of the airfoils of the fan blades lie in the flow channel of the secondary flow. As a result, a more favorable flow can be achieved in the channel for the secondary flow.

It is expedient if the combustion chamber is axially directed in the outer end region of a fan blade or in the part of the fixed housing which surrounds the fan. The combustion chamber can be directed opposite to the direction of thrust. As a result of this alignment of the combustion chambers in the fan blade or the outer ring or the surrounding housing section, only a small radial design space is required, so that the outer diameter of the jet engine can remain small. Also, only a relatively flat annular groove is needed on the inside of the housing shell in order to accommodate the combustion chambers or the fan ring. The outlet channel opens into the middle section in the back of a fan blade, the middle section being located in the annular channel of the secondary flow.

However, it can also be provided that the combustion chamber is disposed radially along a fan blade in the airfoil thereof. Then the fan blades can taper out to the end, and no outer fan ring is required for stabilization. However, the combustion chamber is then closer to the axis of rotation, so that the additional compression of the air upstream of the combustion chambers is reduced.

It can be provided that each fan blade has a combustion chamber. However, it is also possible for only every second or third fan blade to have a combustion chamber. This depends on the desired thrust, among other things. A combustion chamber can also extend into the fan ring by way of a plurality of fan blades. The outlet channel can then be distributed over a plurality of fan blades.

The fuel is preferably fed by way of the main shaft, to which the fan blades are also attached. It is provided that fuel feed for the combustion chambers takes place through the main shaft, said fuel feed being connected to the fuel supply through a seal. The seal can be designed as a labyrinth seal. Such seals are robust and maintenance-free. The fuel lines can be led out of the jet engine through supports between the inner housing section and the outer housing walls.

It can be provided that the inflowing air in the primary circuit is compressed by a compressor upstream of the combustion chamber. It is useful if the main shaft drives the compressor in the primary flow. The efficiency can thus be increased.

In detail, the arrangement can be such that the compressor is disposed upstream of the fan in the axial direction, so that the compressed air can be directed into the fan blades without reversing. The fan and thus the fan blades thereof are then downstream of the compressor. The compressor is disposed coaxially relative to the fan and is located inside the jet engine housing. The inflowing air thus goes directly to the compressor. The compressor is surrounded by an inner housing section which is surrounded by the outer housing to form an annular channel. The secondary flow in which the fan with the combustion chambers is located is formed in the annular channel. The outlet cone is disposed downstream of the fan blades in the axial direction. The compressed air is directed radially into the fan blades downstream of the compressor. Overall, this results in a shorter design length of the jet engine.

Figure 2:
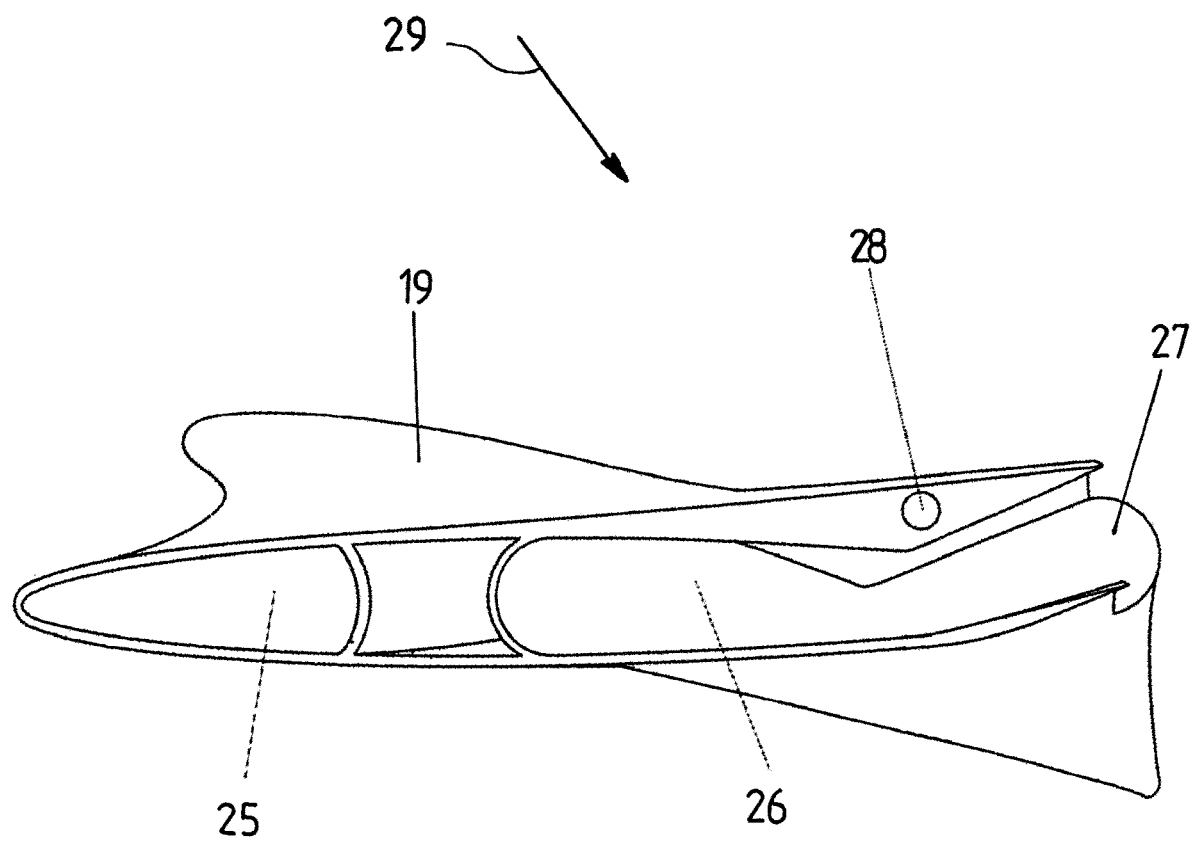
Figure 3:
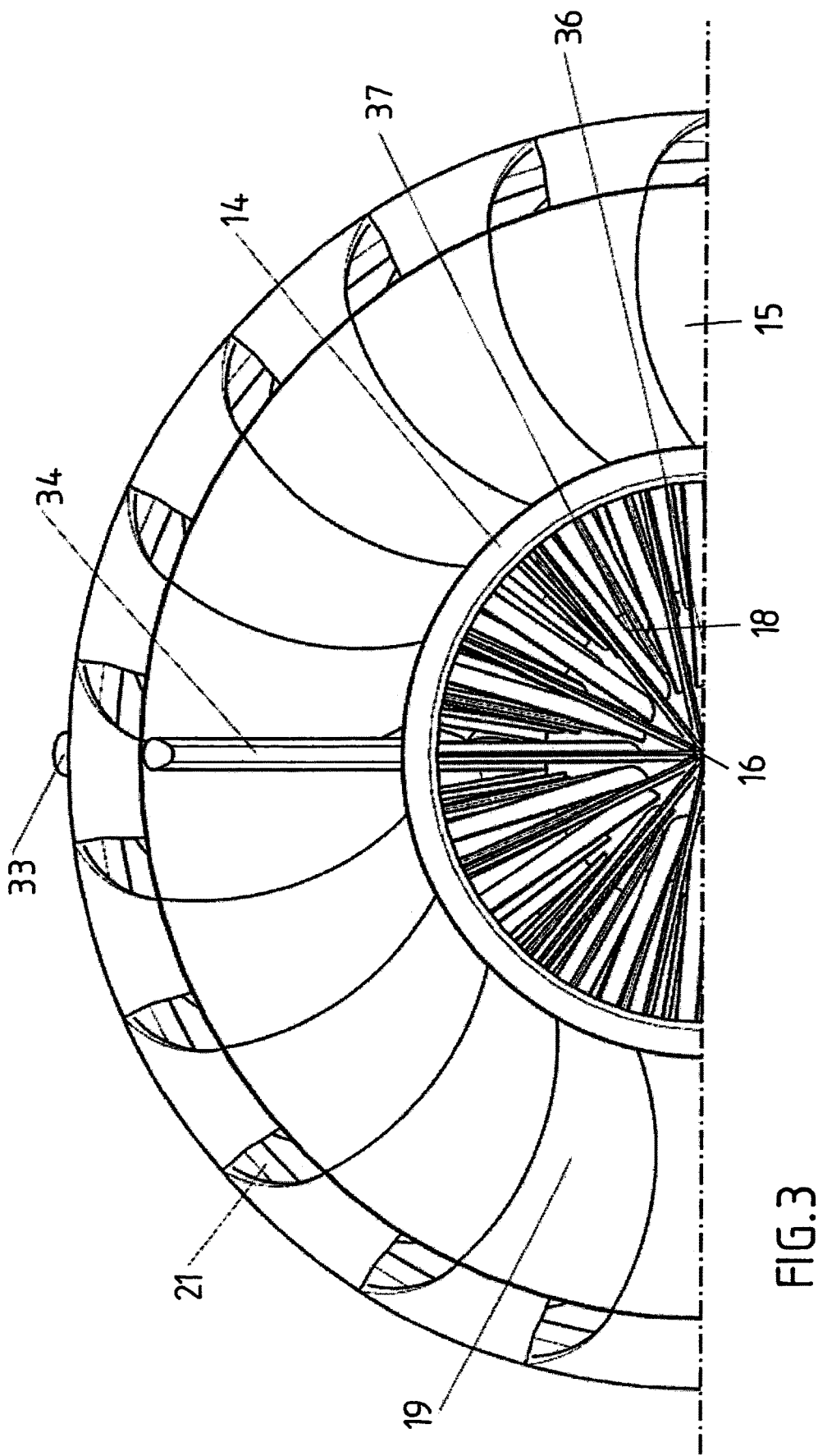
Figure 4:
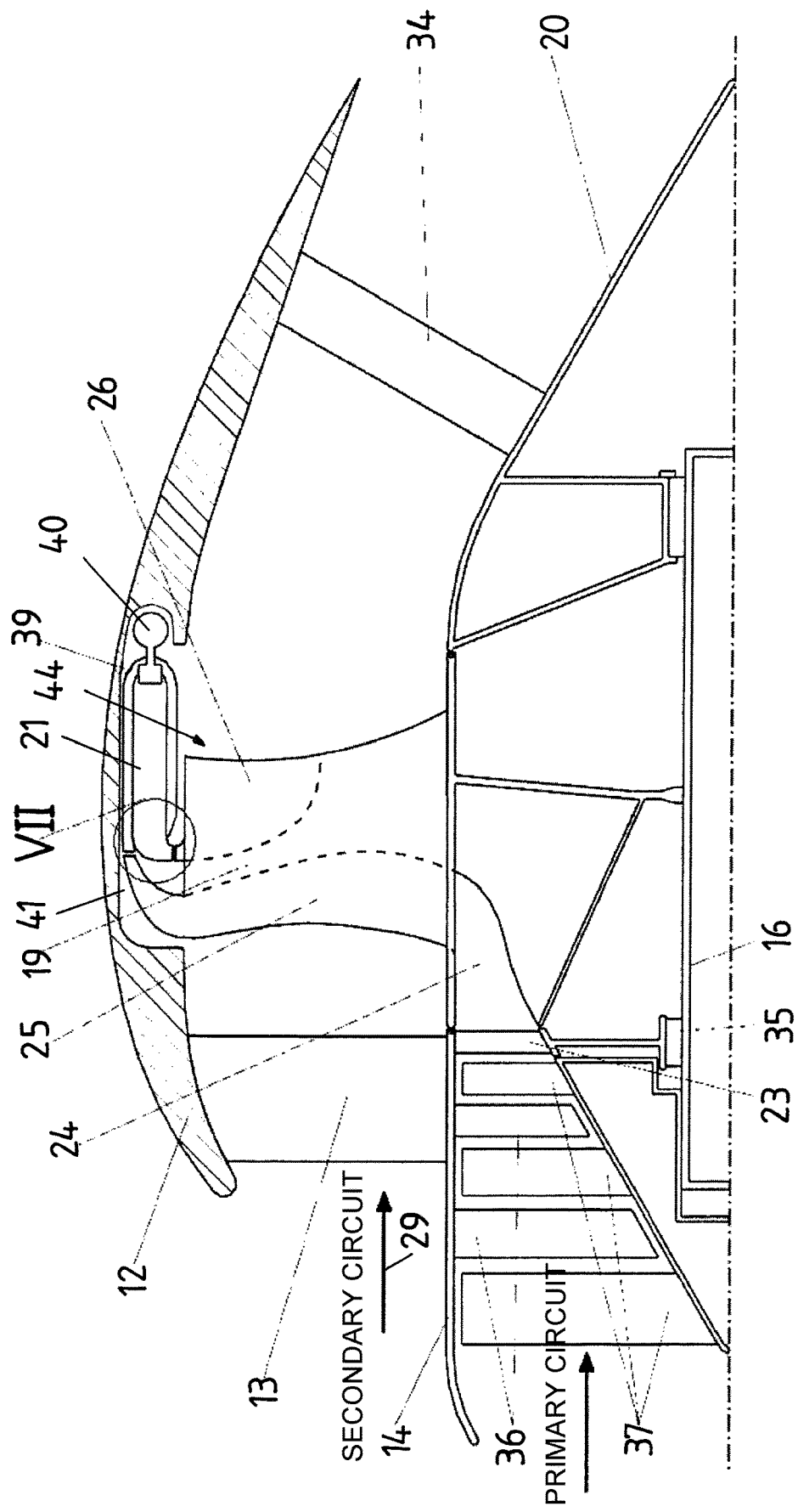
Figure 5:
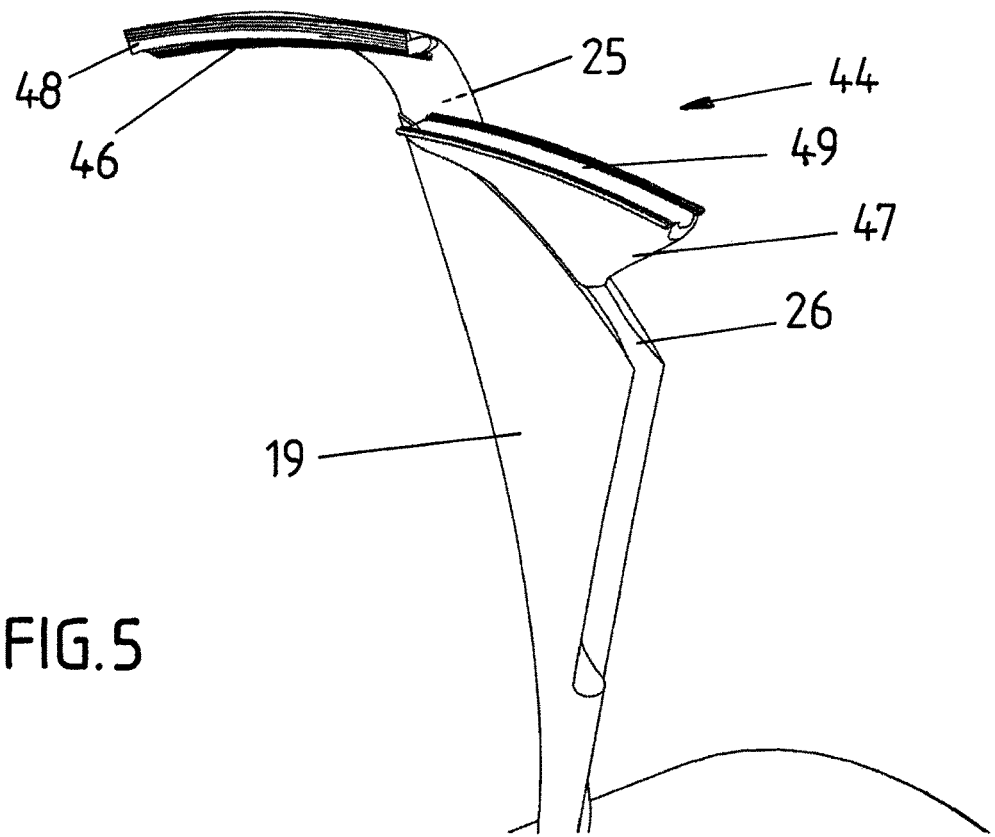
Figure 6:
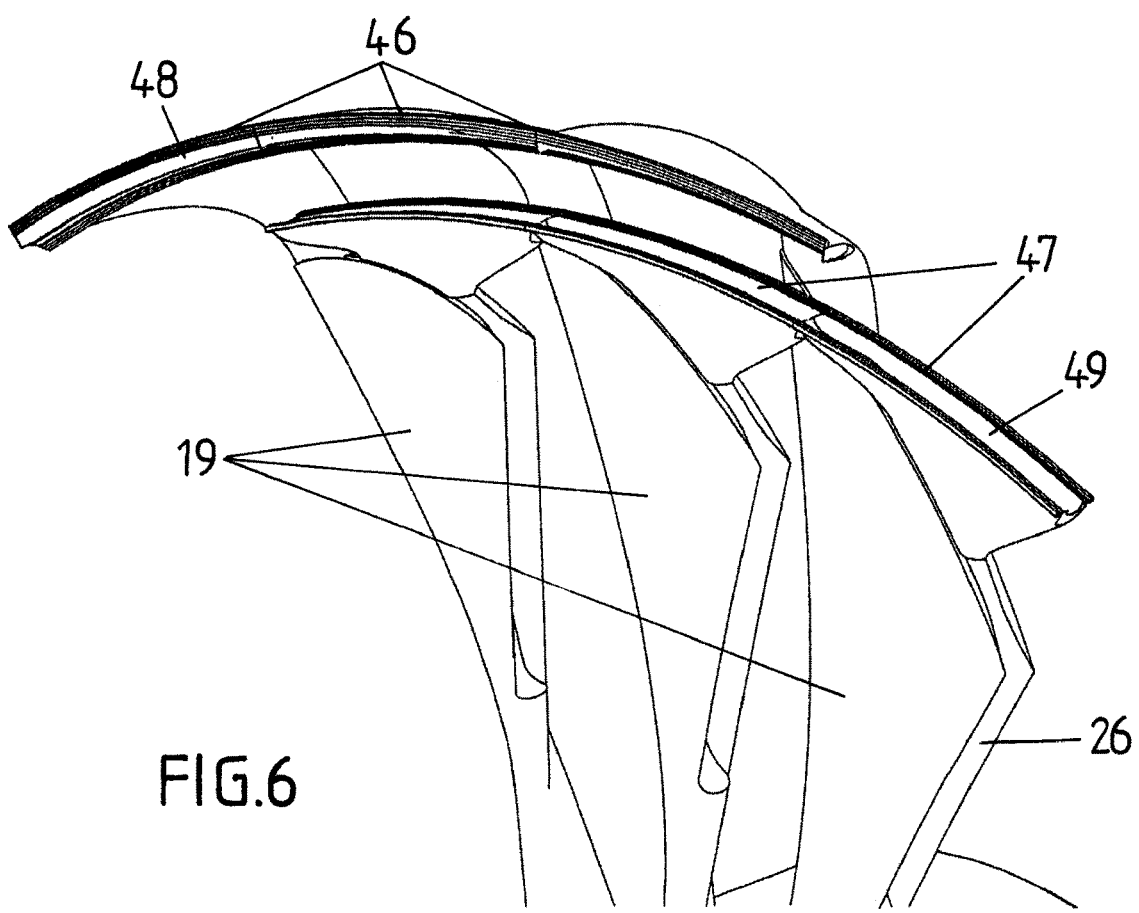
Figure 7:
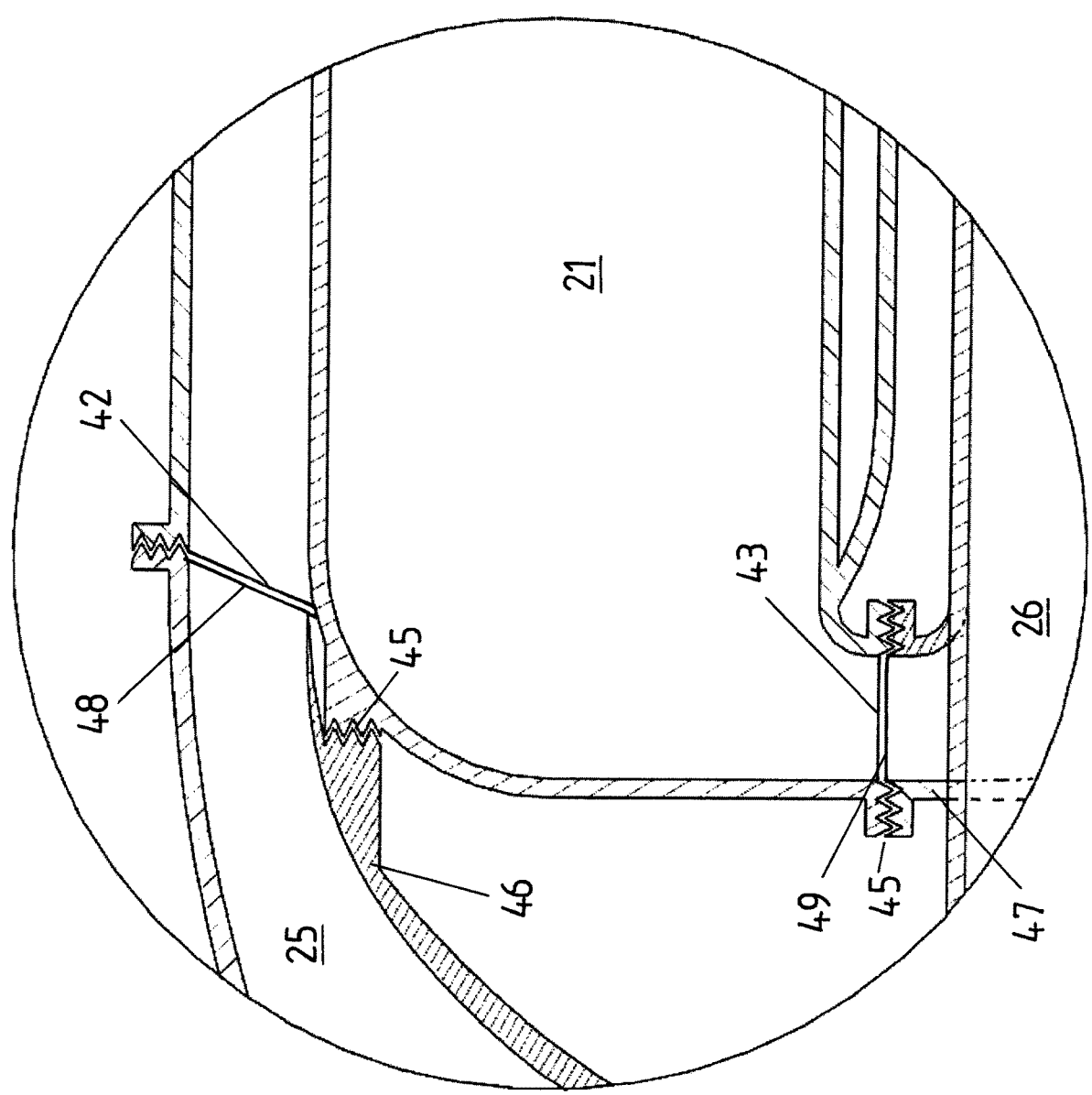

The invention will be explained in more detail below with reference to the schematic drawing. The following figures show:

FIG. 1 a longitudinal section through the jet engine according to a first embodiment of the invention, FIG. 2 a section along the line II-II in FIG. 1 through a fan blade, FIG. 3 the front view of the jet engine in FIG. 1 without the outer housing, FIG. 4 a longitudinal section through the jet engine according to a second embodiment of the invention, FIG. 5 a fan blade in an enlarged perspective view of the jet engine in FIG. 4, FIG. 6 a plurality of fan blades according to FIG. 5 side by side in the installed position and FIG. 7 detail VII in FIG. 4.

The jet engine shown schematically in FIGS. 1 to 3 has a fixed housing 11 which comprises an outer housing wall 12 which is connected to an inner housing section 14 by way of radial supports 13. Between the inner housing section 14 and the outer housing wall 12 there is an annular channel 15 in which the secondary flow is formed.

A main shaft 16 is rotatably mounted in the inner housing section 14. This main shaft 16 supports an axial compressor 18 at the front end 17 of the shaft, the compressor having several stages with fixed guide vanes 36 and blades 37 rotating with the main shaft.

Also, the fan blades 19 of the fan are disposed on the main shaft 16. The fan blades 19 thus rotate in the same direction and at the same rotational speed as the compressor stages. In principle, a gearbox or coaxial shafts can also be present in order to enable different directions of rotation or rotating speeds of the fan and the compressor.

The outlet cone 20 of the housing is located further downstream in the direction of flow and in FIG. 1 on the right side. The outlet cone 20 can have a cross section that tapers at least partially in the flow direction. The main shaft 16 is rotatably supported in the inner housing section by way of bearings 35.

In each of the fan blades 19 there is a combustion chamber 21 which is supplied with fuel by way of a central fuel feed 22. The fuel is conducted through a labyrinth seal 38 from a fixed housing part into the main shaft. The fixed fuel line 33 is guided through a rear support 34 in the flow direction 29 from the inner housing section 14 to the outer housing wall and out of jet engine, where it can be connected to the fuel pump and the fuel tank.

A fuel line 28 runs from the main shaft 16 in the inner housing section through the fan blade 19 to the combustion chamber 21. The outlet 23 of the compressor 18 passes through channels 24 from the interior of the inner housing section 14 into air channels 25 in the fan blades and thus to the combustion chambers 21. The fuel is combusted in the combustion chambers 21, and the exhaust gases enter the secondary flow through an outlet channel 26 in the fan blades through a partially axially- and partially tangentially-oriented outlet opening 27 in the fan blade. The exit of the outlet channel 26 from the fan blade 19 can extend over the entire free height of the fan blade 19.

The combustion chambers 21 are disposed at the outer end sections of the fan blades. The inflowing and compressed air from the compressor 18 is further compressed up to the combustion chamber 21 by the rotary movement of the fan.

Furthermore, the combustion chamber 21 in the exemplary embodiment shown is aligned axially and opposite to the flow direction 29. This keeps the diameter of the fan relatively small.

On the inside 30 of the outer housing wall 12 there is a circumferential annular groove 31 in which the outer ends of the fan blades 19 extend. Seen from the front, the outer ends are therefore covered by the outer housing wall so that only the middle sections of the fan blades 19 are in the secondary flow.

Furthermore, it is provided in the exemplary embodiment shown that the outer ends of the fan blades are connected to one another by way of a fan ring 32. This stabilizes the fan and there is sufficient space for the combustion chambers 21. This fan ring 32 runs in the annular groove 31 in the inside 30 of the outer housing wall 12. The outlet opening 27 for the exhaust gases is located in a radial area of the fan blades located in the annular channel 15 for the secondary flow.

The exiting exhaust gas from the combustion chambers 21 is mixed with the secondary flow and expelled at the outlet cone 20 of the housing 11, producing the thrust. The jet engine does not need to have a turbine to drive the fan and the compressor. Rather, they are driven by the partial exhaust gas stream emerging from the fan blades in the tangential direction. The exhaust gas flow emerging from the fan blade, together with the air from the secondary circuit, causes the thrust.

The jet engine shown in FIGS. 4 to 7 is fundamentally identical to the jet engine in FIGS. 1 to 3, and the same or equivalent parts are referred to below using the same reference numerals. In the exemplary embodiment shown in FIG. 4, the combustion chambers 21 are not located in the fan blades 19 but in the housing section 39 surrounding them. The combustion chambers 21 are supplied with fuel by a fuel line 40 running peripherally there.

The combustion chambers 21 therefore no longer rotate, but are located in the fixed housing section 39, which has corresponding inward-facing receptacles 41 so that the combustion chambers 21 and their inlet openings 42 for the air feed and their outlet openings 43 for the exhaust gas are in the immediate vicinity of the free ends 44 of the fan blades 19 lie in order to guide the air from the air channels 25 of the fan blades into the combustion chamber 21 and the exhaust gas of the combustion chambers 21 into the outlet channel 26 of the fan blade. The transitions of the channels 25, 26 from the fan blade to the combustion chambers 21 are shown in FIG. 7. Labyrinth seals 45 are provided which bring about a tight transition.

There can be several receptacles 41 in the housing, in each of which a combustion chamber 21 is disposed. However, it can also be provided that the receptacle has an annular design and accommodates an annular circumferential combustion chamber 21.

The inlet openings 42 and the outlet openings 43 of the combustion chambers 21 lie in a circumferential channel which is open in the direction of the free ends of the fan blades. The fan blades 19 have, at their free ends 44, sections 46 and 47 which widen in the circumferential direction and are each designed in the form of an arc section. In the assembled and installed position, these sections 46, 47 each form a closed ring. One ring holds the outlet opening 48 of the air inlet channel 25 of the fan blade 19, while the other ring comprises the inlet opening 49 for the exhaust gas into the fan blade 19.

The annular openings of the fan blades 19 thus formed are in flow connection with the fixed annular openings 42, 43 of the combustion chambers 21 in the fixed housing section 39. This creates a dense and closed flow path for the air on the one hand and the exhaust gas on the other.

The invention claimed is:

1. A jet engine with a fixed housing (11), in which a primary flow is formed, in which incoming air is burned in at least one combustion chamber (21), and in which housing (11) a secondary flow is formed, in which incoming air is accelerated by a fan and is expelled at an outlet cone (20) of the housing (11) together with exhaust gas from the at least one combustion chamber (21), said fan being rotatably mounted about an axis on a main shaft (16) and has a plurality of substantially radially extending fan blades (19), wherein at least one of the fan blades has at least one air inlet channel (25) for the primary flow which conducts the air of the primary flow through the fan blade (19) to the at least one combustion chamber, which is disposed in a part of the housing surrounding the fan, wherein at least one of the fan blades has an outlet channel (26) with an at least partially axially-aligned and at least partially tangentially-aligned outlet opening (27) in order to supply the exhaust gas from the at least one combustion chamber (21) to the accelerated air of the secondary flow, said air-exhaust gas mixture emerging while generating thrust at the outlet cone (20) of the housing (11) of the jet engine, wherein free ends (44) of the fan blades (19) open into a ring which has two circumferential openings (48, 49), wherein one of the circumferential openings (48) is in flow connection with the at least one air inlet channel (25) in the at least one of the fan blades (19) and with an air inlet opening of the at least one combustion chamber (21), and wherein the other one of the circumferential openings (49) is in flow connection with the outlet channel (26) in the at least one of the fan blades and an exhaust gas outlet of the at least one combustion chamber (21).

2. The jet engine according to claim 1, wherein the free ends (44) of the fan blades (19) each have a circumferentially expanded first region (46) which has the opening for the air inlet flow and a second region (47) expanded in a circumferential direction which has the opening for the exhaust gas flow, said first and second regions (46, 47) having an arc-shaped contour as viewed from a front such that the respective openings of the first and second regions each form the circumferential openings (48, 49) in an installed position.

3. The jet engine according to claim 1, wherein the at least one combustion chamber (21) is axially aligned in the part of the housing surrounding the fan.

4. The jet engine according to claim 3, wherein the at least one combustion chamber (21) is oriented opposite to the thrust direction.

5. The jet engine according to claim 1, wherein the incoming air in the primary flow is compressed by a compressor (18) upstream of the at least one combustion chamber (21).

6. The jet engine according to claim 5, wherein the main shaft (16) drives the compressor (18) in the primary flow.

* * * * *